United States Patent [19]
Schrewe et al.

[11] 4,132,003
[45] Jan. 2, 1979

[54] APPARATUS FOR MEASURING CURVATURE AND OTHER GEOMETRIC RELATIONS OF DUAL ROLLER TRACKS

[75] Inventors: Hans Schrewe, Duisburg; Fritz P. Pleschiutschnigg, Dusseldorf, both of Fed. Rep. of Germany

[73] Assignee: Mannesmann Aktiengesellschaft, Dusseldorf; Gustav Wiegard Maschinenfabrik, Witten, both of Fed. Rep. of Germany

[21] Appl. No.: 827,570

[22] Filed: Aug. 25, 1977

[30] Foreign Application Priority Data

Aug. 27, 1976 [DE] Fed. Rep. of Germany ....... 2639241

[51] Int. Cl.² .......................... G01B 7/00; G01B 7/28
[52] U.S. Cl. ........................................... 33/182; 33/174 L
[58] Field of Search ................. 33/174 L, 174 R, 182; 164/4, 150

[56] References Cited

U.S. PATENT DOCUMENTS

| | | | |
|---|---|---|---|
| 3,780,442 | 12/1973 | Gresho | 33/174 R |
| 3,821,856 | 7/1974 | Rapp | 33/174 R |
| 3,937,271 | 2/1976 | Akiba et al. | 33/182 |
| 3,939,568 | 2/1976 | Gonos et al. | 33/143 L |
| 3,962,794 | 6/1976 | Kima et al. | 33/174 L |
| 3,983,631 | 10/1976 | Dutzler | 33/174 L |

*Primary Examiner*—Richard R. Stearns
*Attorney, Agent, or Firm*—Smyth, Pavitt, Siegemund, Jones & Martella

[57] ABSTRACT

The curvature of dual roller tracks is measured by centering a frame on two oppositely disposed rollers of the two tracks, and by measuring various distances and spacing parameters of the track rollers to both sides. The measurements are carried out through spindle drives and protractible feelers, all operated directly or indirectly in relation to a common reference point.

4 Claims, 3 Drawing Figures

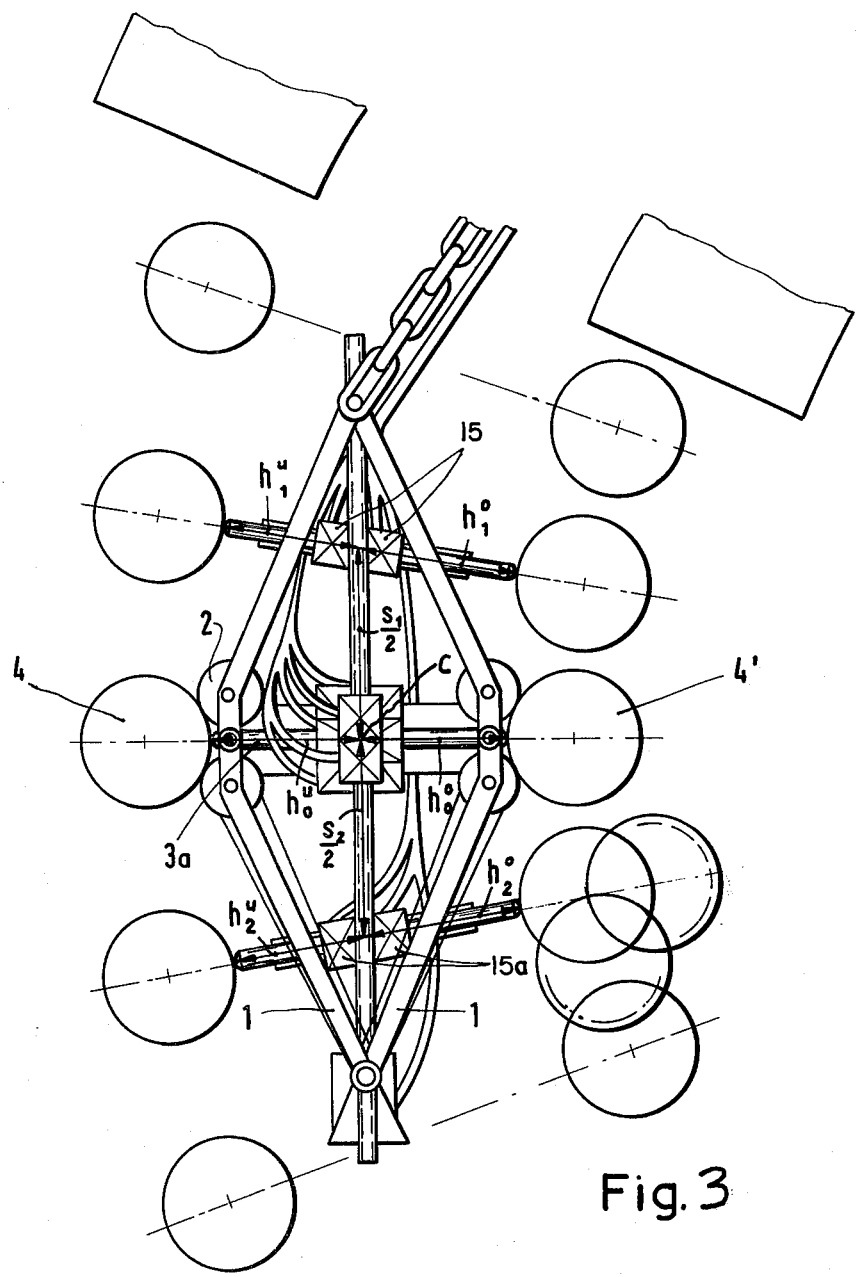

APPARATUS FOR MEASURING CURVATURE AND OTHER GEOMETRIC RELATIONS OF DUAL ROLLER TRACKS

BACKGROUND OF THE INVENTION

The present invention relates to measuring and testing the geometric relation of the rollers of two roller tracks in relation to each other; and more particularly, the invention relates to measuring curvature of such dual roller tracks.

Machines for continuous casting of ingots usually include an arrangement of roller tracks to support and to withdraw the ingot as emerging from the bottom of a mold. This roller arrangement usually includes two tracks of rollers engaging the ingot from opposite sides. The tracks are usually constructed so that respective two rollers face each other across the withdrawal and transport path between the two tracks. Such two rollers define a gap between them whose width is rather critical as far as the thickness of the object (ingot) passing through is concerned; the ingot should engage both rollers and be duly supported but not unduly squeezed by them.

The tracks are curved to veer the ingot into the horizontal. That curvature may also be a rather critical parameter of the tracks, particularly if the curvature has to undergo changes (see e.g. U.S. Pat. Nos. 3,707,180; 3,645,323; see also 3,994,334.)

In the past, track geometry has been measured optically or by means of superimposed dummy patterns or just manually by an operator, but the latter method is rather crude as far as curvature testing is concerned.

DESCRIPTION OF THE INVENTION

It is an object of the present invention to provide a new apparatus for measuring and testing the curvature and other geometric parameters as established by two roller tracks and as defined, it is not believed that comparable equipment is known at the present time.

In accordance with the preferred embodiment of the present invention, a certain basic unit in combination with supplementing equipment is suggested. The basic unit is a foldable frame of parallelogram-like contour of which two opposing corners are provided with centering rollers for engagement with two rollers respectively of the two tracks and facing each other across the transport path. A feeler arrangement is centered between the centering rollers so that the feelers when engaging these two track rollers together measure the gap width as established by and between the two track rollers. This basic unit is, in addition, provided with means for moving it between and along the two tracks. The basic unit as such is claimed per se in an application by us and of common assignee and others*). The supplementing equipment in combination with the basic unit permits the measuring of the actually existing (or not existing) curvature of the withdrawal and transport paths as established by the roller tracks. This supplementing equipment is comprised of two additional feeler arrangements, movable along a common axis, and extending transversely to the measuring axis of the basic unit, to engage the rollers on either side of those engaged by the feelers of the basic unit, for measuring the disposition of the track rollers relative to that common axis and the established reference points thereon. In fact, one will ascertain relative geometric data of respective six track rollers relative to each other from which the local conditions of geometry of the tracks can readily be deduced. The common axis may, in fact, be the axis of spindle drives for these additional feelers, whereby these feelers have their own drives for protracting and retracting feeler arms along prescribed directions. Measurement may be carried out transversely to that common axis or in directions having an adjustable angle to that axis commensurate with the local track curvature.

*) (Attorney's Docket No. D-6094) now Ser. No. 827,614, filed Aug. 25, 1977.

The measuring equipment permits measurement of track parameters in conjunction and concurrently with acquiring other data, such as roller mobility.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 2 and 3 show the same equipment in different positions of measurement, including illustration of relevant measuring parameters and values.

Figure 1:
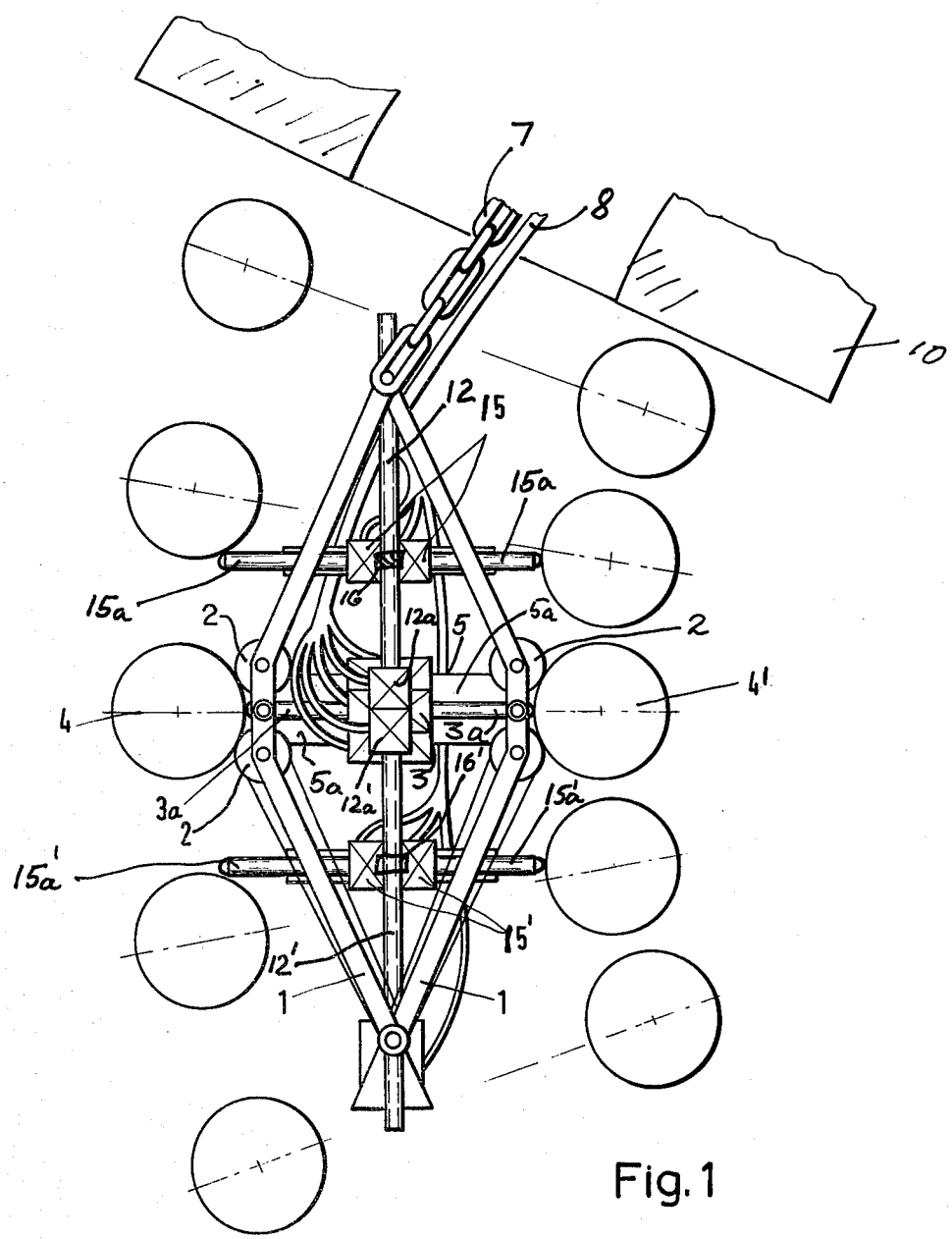
FIG. 1 illustrates a side view of the measuring equipment in accordance with the preferred embodiment as disposed in the upper portion of a roller track for withdrawing a continuously cast ingot from a mold.

Proceeding now to the detailed description of the drawings, the Figures show a mold 10 for continuous casting of a curved ingot. Rollers 4, 4' of two tracks are disposed underneath the mold and along a curved withdrawal path which ultimately veers into the horizontal. The measuring equipment includes a frame 1 having configuration of a parallelogram, or at least approximately so. Drives 5 operating drive elements 5a permit folding or unfolding of the frame 1 to place positioning rollers 2 into and out of engagement with oppositely positioned track rollers 4, 4'. The frame 1 includes, in addition, a belt drive (not shown, but see the copending application by us and others; Ser. No. 827,614, filed Aug. 25, 1977 (Attorneys Docket No. D-6094) of common assignee). The frame is suspended by means of a chain 7 along which also run cable 8 to and from the several operating units including the frame spreading drive 5 and others.

The frame 1 supports a plurality of feeler and feeler devices. First, there is a drive 3 for a pair of feeler arms 3a, each extending symmetrically between upper and lower rollers 2, but in a different (vertical) plane as either roller. The drives 3 move the feeler arms from retracted to protracted positions, preferably in symmetric relation to each other, to ascertain the distance between two track rollers 4, 4' from each other and, to which the frame is centered by determining the distance of the rollers 4, 4' from a common reference plane which extends transversely to the feeler arms.

The frame 1 supports, in addition, two spindles 12, 12', which can be turned independently by drives 12a, 12a'. As indicated only schematically, a feeler drive 15 is mounted on a holder 16 which, in turn, is threadedly received by spindle 12. Drive 15 can be adjusted by tilting it in a vertical plane relative to holder 16. In addition, drive 15 operates two oppositely movable feeler arms 15a. The drive 15 moves these arms 15a independently, until they abut the track rollers.

Analogously, spindle 12' threadedly supports a holder 16' for tiltably mounting a drive 15', which operates two oppositely movable feeler arms 15a'. It should be noted that the tiltability of the drives 15, 15' is not essential in principle. Tilting permits the direct measurement of the aperture distance of the two rolls 4, 4' above and of the two rolls 4, 4' below the pair of rolls 4, 4' with respect to which the frame is centered by means of the positioning rolls 2 (FIG. 3). Without tilting, the true gap width of these other track rollers must be ascertained indirectly on the basis of shortest distance from the vertical spindle axis and the different positioning levels in which this is obtained for any two facing rolls (see FIG. 2).

Figure 2:
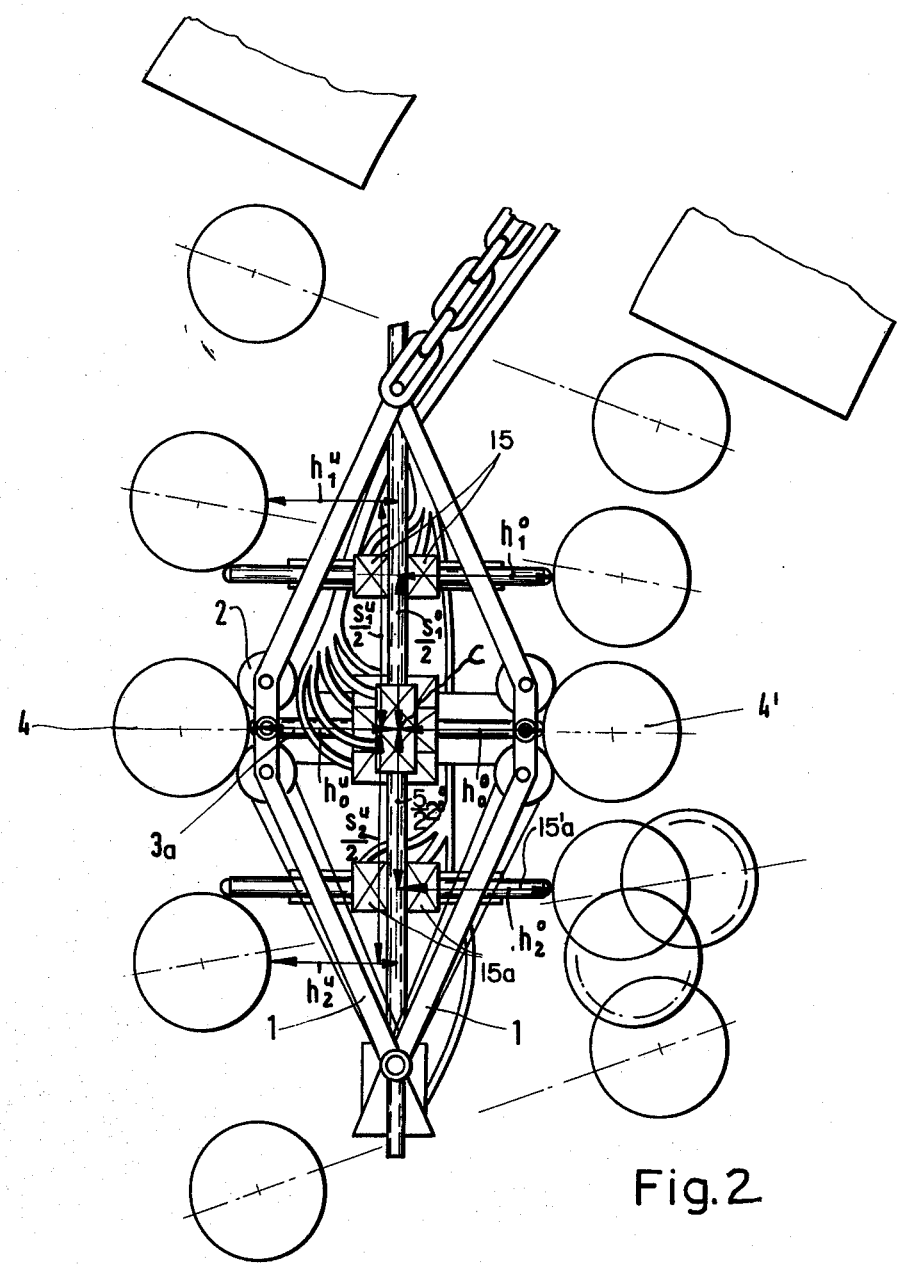

As can be seen more specifically from FIGS. 2 and 3, the two spindles 12, 12' are aligned on a common axis in the above identified reference plane and intersecting (in the projection in a common vertical plane) the axis along which the feelers 3a are moved, which is the centering axis of the frame. That point of intersection can be deemed to establish a common point of reference C in the reference plane.

The gap width measurement as per 3, 3a is carried out with reference to that common reference C. Any width measurements carried out devices 15, 15a and 15', 15a', are carried out with respective reference points established on the common spindle axis by position adjustment of the drives 15, 15' (or more precisely, of the holders 16, 16') which, in turn, are references to common reference point C.

All devices 3, 12a, 12a', 15, 15', are equipped with transducers ascertaining the positions of the respectively moved devices and to signal the positions thereof via cable 8 to the external unit which acquire the measuring results.

Considering now the measuring operation and here particularly the case (FIG. 2) of non-tilting. The adjustment is made that rolls 2 engage a pair of facing track rollers 4, 4', and feelers 3a measure individually the distance of the points of contact from common reference point C in the reference plane, which establishes the two distances $h_o^u$ and $h_o^o$; the sum $h_o^u + h_o^o$ is, of course, the ascertained gap width between these two rollers 4, 4' to which the frame is centered. In addition and, possibly, simoultaneously, drive 15 is moved on spindle 12 (through rotation of the spindle) to a distance $S_1^o/2$ from the common reference point, established by a minimum protraction distance $h_1^o$ of one feeler 15a when engaging the next upper roll 4' from the spindle axis and the reference plane. Subsequently, drive 15 is moved on spindle 12 to a distance $S_1^u/2$ from the common reference point for a minimum distance of the tip of the other feeler 15a when engaging the next upper roll 4, from the spindle axis and the reference plane. Analogously, the feelers 15a' operated by drive 15' on spindle 12' monitors the feeler tip distances $h_2^o$ and $h_2^u$ from the reference plane at drive distances from the common reference point C, $S_2^u/2$ and $S_2^o/2$, respectively and measured in said reference plane.

FIG. 2 shows respective two feelers 15a, 15a' in engagement with track rollers 4'. In order to bring the respective other two feelers into engagement with track rollers 4, drives 15, 15' have to be moved further away from the common reference C.

The intersections of the feeler axes with the common spindle axes establish the reference points on that axis, necessary for the measuring the gap width between track rollers above and below those to which the frame is centered. The differences of these reference points on the spindle axis as well as their relation to the common reference are all relevant parameters for the geometry of the two tracks.

The dashed and dash-dot marked rolls 4', respectively, represent radial and tangential displacements of one roll 4', constituting two incorrect conditions and positions which may be found by the equipment. The following table sets forth in three columns the resulting parameters as defined and their relation for a correct track (left-hand column), the case of a radial displacement of the one roll as per dash line marking (center column) and the case of the tangentially displaced roll as per dash-dot marking. The equipment has, of course, the illustrated position as per FIG. 3.

| $\frac{S_1^o}{2} = \frac{S_2^o}{2}$ | $\frac{S_1^o}{2} > \frac{S_2^o}{2}$ | $\frac{S_1^o}{2} < \frac{S_2^o}{2}$ |
|---|---|---|
| $\frac{S_1^u}{2} = \frac{S_2^u}{2}$ | $\frac{S_1^u}{2} = \frac{S_2^u}{2}$ | $\frac{S_1^u}{2} = \frac{S_2^u}{2}$ |
| $h_1^o > h_o^o < h_2^o$ | $h_1^o > h_o^o < h_2^o$ | $h_1^o > h_o^o < h_2^o$ |
| $h_1^u < h_o^u > h_2^u$ | $h_1^u < h_o^u > h_2^u$ | $h_1^u < h_o^u > h_2^u$ |
| $h_1^o = h_2^o$ | $h_1^o < h_2^o$ | $h_1^o < h_2^o$ |
| $h_1^u = h_2^u$ | $h_1^u = h_2^u$ | $h_1^u = h_2^u$ |
| $\frac{h_1^o}{h_1^u} > \frac{h_o^o}{h_o^u} < \frac{h_2^o}{h_2^u}$ | $\frac{h_1^o}{h_1^u} > \frac{h_o^o}{h_o^u} << \frac{h_2^o}{h_2^u}$ | $\frac{h_1^o}{h_1^u} > \frac{h_o^o}{h_o^u} << \frac{h_2^o}{h_2^u}$ |
| $\frac{h_1^o}{h_1^u} = \frac{h_2^o}{h_2^u}$ | $\frac{h_1^o}{h_1^u} < \frac{h_2^o}{h_2^u}$ | $\frac{h_1^o}{h_1^u} < \frac{h_2^o}{h_2^u}$ |
| $\frac{h_o^o}{h_o^u} = 1$ | $\frac{h_o^o}{h_1^u} = 1$ | $\frac{h_o^o}{h_o^u} = 1$ |

$h_i^u + h_i^o = \text{const}$ (gap width)    $h_i^u + h_i^o = h_o^u + h_o^o < h_2^u + h_2^o$ $i = 1, 2, 3$ FIG. 3 illustrates the situation when the two drives 15, 15' can tilt on their holder 16. The feelers 15a, 15a', therefore, measure in each instance the minimum distance, i.e. the true gap width between two facing rollers 4, 4'. The individual minimum distances $h_1^{o,u}$ in the tilted position of drive 15 are, of course, established now for the same distance $S_1/2$ from the common reference. The same is true in regard to tilted drive 15' and its distance $S_2/2$. FIG. 3 shows also the two error conditions as were assumed in FIG. 1. The table below indicates how the error conditions are ascertained in terms of parameter and measuring value relations.

| $\frac{S_1}{2} = \frac{S_2}{2}$ | $\frac{S_1}{2} = \frac{S_2}{2}$ | $\frac{S_1}{2} < \frac{S_2}{2}$ |
|---|---|---|
| $h_1^o > h_o^o < h_2^o$ | $h_1^o > h_o^o < h_2^o$ | $h_1^o > h_o^o < h_2^o$ |
| $h_1^u < h_o^u > h_2^u$ | $h_1^u < h_o^u > h_2^u$ | $h_1^u < h_o^u > h_2^u$ |
| $h_1^o = h_2^o$ | $h_1^o < h_2^o$ | $h_1^o < h_2^o$ |
| $h_1^u = h_2^u$ | $h_1^u = h_2^u$ | $h_1^u = h_2^u$ |
| $\frac{h_1^o}{h_1^u} > \frac{h_o^o}{h_o^u} < \frac{h_2^o}{h_2^u}$ | $\frac{h_1^o}{h_1^u} > \frac{h_o^o}{h_o^u} << \frac{h_2^o}{h_2^u}$ | $\frac{h_1^o}{h_1^u} > \frac{h_o^o}{h_o^u} << \frac{h_2^o}{h_o^u}$ |

*-continued*

| | | |
|---|---|---|
| $\dfrac{h_1^o}{h_1^u} = \dfrac{h_2^o}{h_2^u}$ | $\dfrac{h_1^o}{h_1^u} < \dfrac{h_2^o}{h_2^u}$ | $\dfrac{h_1^o}{h_1^u} < \dfrac{h_2^o}{h_2^u}$ |
| $\dfrac{h_o^o}{h_o^u} = 1$ | $\dfrac{h_o^o}{h_o^u} = 1$ | $\dfrac{h_o^o}{h_o^u} = 1$ |

It should be noted that the device can be operated with fixed orientation angle $\alpha$ for the two drives 15, 15' commensurate with the curvature of the track as given by the angle between planes running respectively through the axes of two track rollers as aligned (or supposedly aligned) across the transport path. Conceivably, the tilt angles could be rendered adjustable by means of suitable drives so that all three gap measurement devices have their feelers (3a, 15a, 15a') aligned along axes which intersect the axes of the track rollers (4, 4'), regarded in each instance as an aligned pair.

It can readily be seen from the tables that the measuring data permit qualitatively the immediate detection of absence or presence of a deviation from the desired track geometry. However, the quantitative acquisition of the stated parameters in conjunction with subsequent triangulation, etc., permits accurate determination of the particulars of the deviation.

The invention is not limited to the embodiments described above but all changes and modifications thereof not contituting departures from the spirit and scope of the invention are intended to be included.

We claim:

1. Apparatus for measuring and testing the relative disposition of rollers of two roller tracks facing each other across a transport path that separates the two tracks and through which objects are moved by and in engagement with the rollers of the two tracks on opposite sides, the apparatus comprising:

an expandable and foldable frame having two opposite corner portions movable toward and away from each other and in which are mounted two sets of centering rolls for engagement with two rollers of the two tracks facing each other across the path;

first feeler means in the frame disposed for sensing the distance between the two engaged rollers of the two tracks from a common reference plane extending parallel to the axes of the two rollers;

second and third feeler means mounted in the frame in adjustably spaced disposition to said common reference plane and each respectively measuring distances of rollers of the two tracks with respect to said reference plane, whereby the second feeler means are adjustably positionable for measuring engagement with two rollers, respectively, of the two tracks to one side of the rollers engaged by the first feeler means, and the third feeler means are adjustably positionable for measuring engagement with two rollers, respectively, of the two tracks to the other side of the rollers engaged by the first feeler means.

2. Apparatus as in claim 1, including spindle means extending in said plane, said second and third feeler means being mounted for movement along said spindle means.

3. Apparatus as in claim 2, wherein said second and third feeler means are mounted for tilting about axes in said plane so that points of engagement by the second feeler means with two respective rollers of the two tracks are aligned respectively on a first line and points of engagement by the third feeler means with two respective rollers of the two tracks are aligned along a second other line, said first and second lines being non-orthogonally oriented to said reference plane in a curved portion of the track.

4. Apparatus as in claim 1, wherein the second and third feeler means are mounted on a pair of axially aligned spindles.

* * * * *